(12) United States Patent
Fleytman

(10) Patent No.: US 7,022,042 B2
(45) Date of Patent: Apr. 4, 2006

(54) EPICYCLIC GEAR TRAIN

(76) Inventor: Yakov Fleytman, 3233 Hickory Dr., Lake Orion, MI (US) 48359

( * ) Notice: Subject to any disclaimer, the term of this patent is extended or adjusted under 35 U.S.C. 154(b) by 50 days.

(21) Appl. No.: 10/765,492

(22) Filed: Jan. 27, 2004

(65) Prior Publication Data
US 2005/0164824 A1 Jul. 28, 2005

(51) Int. Cl.
F16H 1/30 (2006.01)

(52) U.S. Cl. .................................. 475/333

(58) Field of Classification Search ................ 475/226, 475/227, 333, 336
See application file for complete search history.

(56) References Cited

U.S. PATENT DOCUMENTS

| | | | |
|---|---|---|---|
| 781,944 A * | 2/1905 | Hall | 475/333 |
| 1,567,933 A * | 12/1925 | Fahnestock | 475/333 |
| 1,683,163 A | 9/1928 | Cone | |
| 1,885,686 A | 11/1932 | Cone | |
| 1,998,891 A | 4/1935 | Benson | |
| 2,208,614 A * | 7/1940 | Watson | 475/333 |
| 2,313,183 A | 3/1943 | Trbojevich | |
| 2,441,989 A | 5/1948 | Brown | |
| 2,924,998 A | 2/1960 | Sem | |
| 2,973,660 A * | 3/1961 | Popper | 475/333 |
| 3,899,939 A * | 8/1975 | Hilado | 475/226 |
| 3,934,493 A | 1/1976 | Hillyer | |
| 4,010,653 A * | 3/1977 | Mekjian | 475/311 |
| 4,016,778 A * | 4/1977 | Von Greyerz | 475/32 |
| 4,043,216 A | 8/1977 | Steer | |
| 4,512,211 A * | 4/1985 | Stritzel | 475/227 |
| 5,088,970 A * | 2/1992 | Dye | 475/227 |
| 5,108,353 A * | 4/1992 | Brewer et al. | 475/227 |
| 5,112,284 A * | 5/1992 | Dye | 475/333 |
| 5,171,193 A * | 12/1992 | Gagliano | 475/333 |
| 5,232,415 A * | 8/1993 | Brewer et al. | 475/333 |
| 5,387,162 A * | 2/1995 | Yang | 475/333 |
| 5,453,062 A * | 9/1995 | White et al. | 475/227 |
| 6,148,683 A | 11/2000 | Fleytman | |
| 6,183,388 B1 | 2/2001 | Hawkins | |
| 6,402,652 B1 | 6/2002 | Fleytman | |
| 6,447,418 B1 | 9/2002 | Fleytman | |
| 6,582,338 B1 * | 6/2003 | Fleytman | 475/227 |

* cited by examiner

Primary Examiner—Sherry Estremsky

(57) ABSTRACT

Epicyclic gear train is comprised of a first gear coaxial to second gear and a satellite gear in a mesh with first and second gears. Satellite gear is an enveloping worm and is placed on a rotating carrier for supporting said satellite where carrier is coaxial to first and second gears. Axis of enveloping worm and axis of first and second matting gears are parallel, intersection or crossing.

Epicyclic gear train could also be comprised of the first gear coaxial to the second gear and two coaxial enveloping worms attached to each other to rotate together in mesh with first and second gears. Enveloping worms are placed on a rotating carrier for supporting said satellites where carrier is coaxial to first and second gears. Axis of enveloping worms and axis of first and second matting gears are parallel or intersected.

8 Claims, 11 Drawing Sheets

EPICYCLIC GEAR TRAIN

FIELD OF THE INVENTION

The present invention relates generally to mechanical power systems, and more particularly, to mechanical devices having gears which reduce or increase speed or torque. This type of the epicyclic gear train could be used in transmissions for gasoline or hybrid cars, agricultural mechanisms, off highway and mining machines, ships and boats, industrial gear boxes, gear heads for electrical motor and in any power train applications.

BACKGROUND OF THE INVENTION

Epicyclic gear train is used in various power train applications for transferring rotary power from an input to an output while changing speed to the output. The most popular use of epicyclic gear train is for planetary gears in automatic vehicles' transmissions. Conventional epicyclic gear train consists of spur or helical gears. Example of different designs of epicyclic gear train is described in U.S. Pat. No. 1,998,891 by Benson, U.S. Pat. No. 2,441,989 by Brown, U.S. Pat. No. 3,934,493 by Hillyer, U.S. Pat. No. 4,043,216 by Steer, U.S. Pat. No. 6,042,086 by Roberts and many patents with planetary gear transmissions.

Examples of using right angle face gears in epicyclic gear train are published in U.S. Pat. No. 6,183,388 by Hawkins, U.S. Pat. No. 2,313,183 by Trbojevich and U.S. Pat. No. 2,924,998 by Sem.

Enveloping worm gearsets, otherwise referred to as enveloping worm/worm gear transmissions, are known in the mechanical power transmission field. The worm gear is driven by the rotation of the enveloping worm with which it meshes. The rotational speed of the associated shaft of the worm gear is a function of the number of teeth on the worm gear and the number of threads on the enveloping worm. The enveloping worm may be single or multiple threaded. The most known enveloping worm is from U.S. Pat. No. 1,683,163 by Cone. Enveloping worm usually has 360 degree or more of thread revolution and is in mesh with matting worm gear where it is placed on top of the worm gear. Axis of rotation of enveloping worm and axis of rotation matting gear are crossed. They are not intersected. This type of mesh has sliding motion along gear tooth and some percentage of rolling motion around axis of worm gear rotation that produces low efficiency reduction and is not recommended to be used in power transferring of mechanical motion. Epicyclic gear train with enveloping worm/worm gear transmission is used as a differential. In U.S. Pat. No. 4,890,511 by Pedersen first enveloping worm satellite is in meshing engagement with first matting gear and second, exactly the same, enveloping worm satellite is in meshing engagement with second matting gear. To produce differential motion it has additional gears for kinematical connection of first enveloping worm satellite with second enveloping worm satellite. The enveloping worm satellites are not attached to each other. Due to low efficiency this epicyclic gear train is used only occasionally for correction of traction.

SUMMARY OF THE INVENTION

Accordingly, it is an object of the present invention to provide a new epicyclic gear train that is smaller and more efficient than any known epicyclic gear train. This gear train uses unique new enveloping worm gearing where enveloping pinion has less than one revolution of worm threads. Enveloping worm thread has meshing engagement with matting gear, where axis of rotations of enveloping worm and matting gear are intersected or parallel. In same face engagement when we have enveloping worm in mesh engagement with two matting gears at the same time it is possible to have axes of enveloping worm and matting gear crossed. This is not the traditional use of enveloping worm in mesh with matting gear. The enveloping worm face transmission or parallel axis transmission is a new type of right angle gears (U.S. patent application Ser. No. 10/435,143) and the basic set is comprised of an enveloping worm and a matting gear. Matting means that profile of the gear is generated by the profile of the enveloping worm. This generation could done by real machining where enveloping worm profile is used as a master profile for the hob or it could be generated mathematically or by a computer model where the profile of the matting gear is defining by the profile of the enveloping worm. Unique feature of this new gear set is able to generate matting gear by enveloping pinion with various ratios. It is possible to change ratio of matting gears for the same pinion by as much as 10%. This means that matting gear can provide good mechanical motion even with some design modifications or manufacturing errors. New unique gear train has motion mostly by rolling with very small percentage of sliding. In motion rolling contact pattern moves along matting gear tooth flank. Since said enveloping worm having a thread less than one revolution is positioned in mesh with matting gear it creates suction for better lubrication. This becomes more likely due to asymmetrical profile of the enveloping worm. (Standard enveloping worm always has a symmetrical design). During engagement, enveloping worm and matting gear make a combination of convex surface profile inside concave surface profile where they have very small difference in surface curvature. This significantly reduces contact stress. Enveloping profile of the worm increases contact ratio average by 30%, which also reduces the over all dimension of the gear set. The new gear set is about 50% smaller than any existing right or parallel axis gearing.

These and other objects of the present invention are obtained by providing an epicyclic gear train with a unique enveloping worm as a satellite gear. Enveloping worm epicyclic gear train according with the present invention has not been known. Thus, those skilled in the art did not consider enveloping worm in mesh with a matting gear having axis of rotation parallel or crossing to mating gear axis of rotation to be feasible for commercial applications. In contrast, the enveloping pinion epicyclic gear train of the present invention utilizes gears that are easily manufactured.

Rolling motion with small percentage of sliding motion significantly increases efficiency of epicyclic gear train. For the same size, this invention has almost twice the torque capacity of traditional helical gearing. Suction teeth action makes excellent teeth lubrication that also reduces heat. It allows different casting designs from not very heat conductive material, even from plastic or ceramic. As compared to prior planetary gear drive, new epicyclic gear train with enveloping worm pinion is more compact, quiet and efficient. Thus, the present invention can replace traditional epicyclic gear train like planetary transmissions in many power train applications, especially mobile transportation devices.

In the present invention, the enveloping worm can be with less than one revolution of threads, which can have only one supporting shaft. Further areas of applicability of the present invention will become apparent from the comprehensive description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this complete description.

BRIEF DESCRIPTION OF THE DRAWINGS

The present invention will become more fully understood from the detailed described below.

DETAILED DESCRIPTION OF THE PREFERRED EMBODIMENTS

Figure 1:
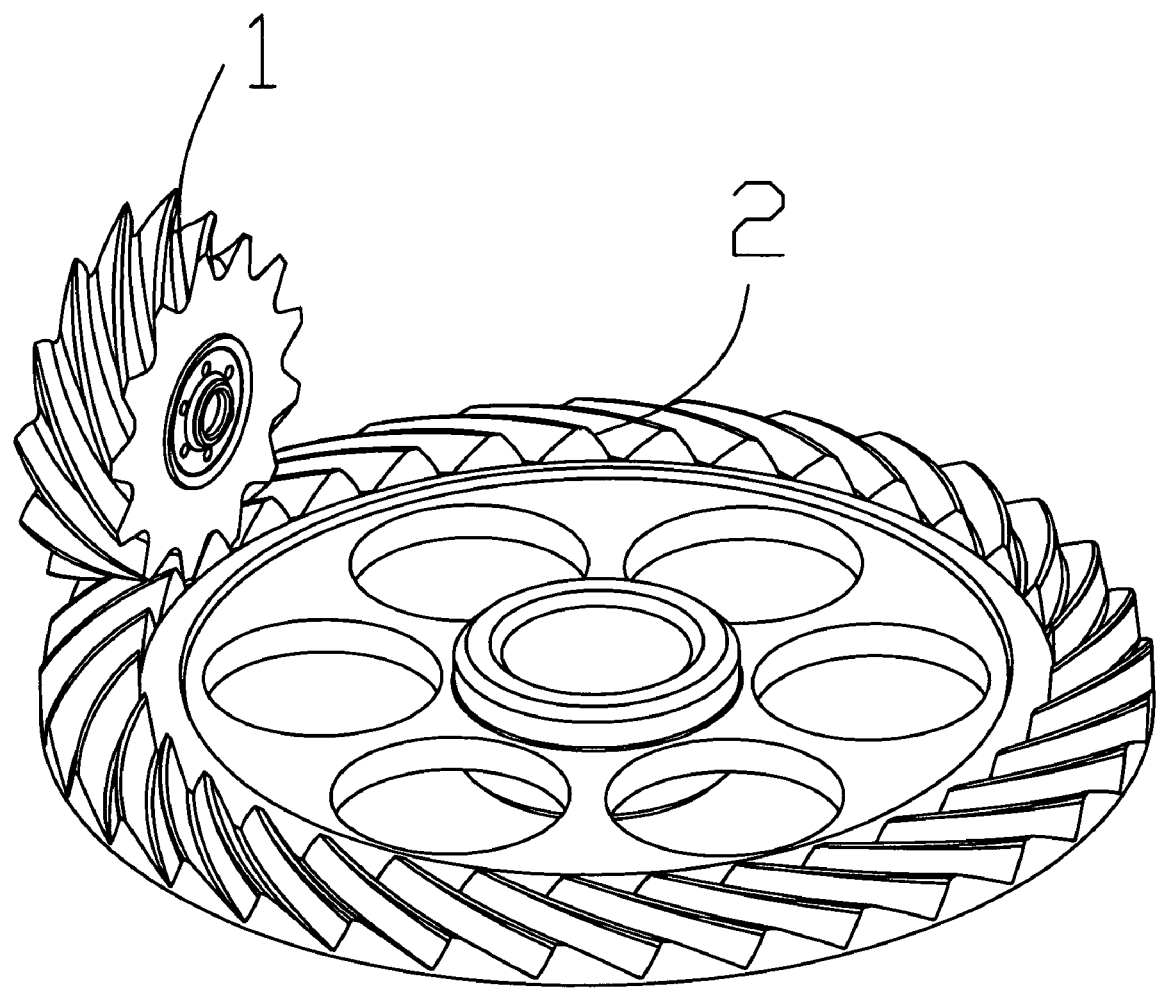
FIG. 1 is an isometric of a design with enveloping worm in mesh with matting face gear where enveloping worm has less than 180 degrees of revolution of threads.

The following discussion relating to FIGS. 1–15 provides a detailed description of the unique epicyclic gear train which can be utilized with the present invention.

In the following design examples the epicyclic gear train could use one satellite gear for meshing engagement with matting gear but for the purpose of dynamic balance and better torque capacity the shown number of satellite gears is more than one.

In a pair of gears the pinion is a gear with less or equal number of gear teeth. Gears shown in schematic views FIG. 3, FIG. 4, FIG. 5, FIG. 6, FIG. 7 and FIG. 8, FIG. 9 are the same gears shown in FIG. 1 and FIG. 2, but in a different view. Second satellite gear in mesh with second matting gear could also be conventional gears: spur or helical, face or spiral bevel gears. In the illustrated pictures not every axis of rotation is shown, but it is obvious that any rotating part has its own axis of rotation. Axis of rotation could be drawn through the middle of a rotating part shaft.

As will be detailed, an epicyclic gear train with a unique enveloping worm in mesh with matting gear embodying the principles of the present invention will be described below with reference to FIGS. 1 through 15. Prior to specific consideration of the drawings, several unique features of the present invention can be discussed. In particular, the present invention is directed to gear sets having an enveloping worm gear in mesh with a matting gear, where an enveloping worm is paced in mesh with a face gear or in mesh with gear having shaft axis parall to enveloping worm axis of rotation. This type of gear produces contact pattern along the gear tooth line: from the left to the right or from the right to the left depending on the direction of rotation. This motion of contact pattern is very different from motion of contact pattern of any gears used in epicyclic gear train. For example, in helical or spiral bevel gears contact pattern in motion is across the gear tooth: from the root to the tip or from the tip to the root depending on the direction of rotation.

The reason for using an enveloping worm as a satellite gear is better torque capacity and more efficient motion. A computer model simulation can be utilized to generate the configuration of the enveloping worm and the matting gear. Then gears could be machined using multi-tasking turning center or a special machine, like machines that are widely used for spiral bevel or helical gear production.

Referring now to the drawings.

FIG. 1 shows an enveloping worm 1 which has at least one thread that is engaged by at least one tooth of said matting gear 2. Said enveloping worm 1 is placed into meshing arrangement with face gear 2 having axis of rotation perpendicular to enveloping worm 1 axis of rotation.

Figure 2:
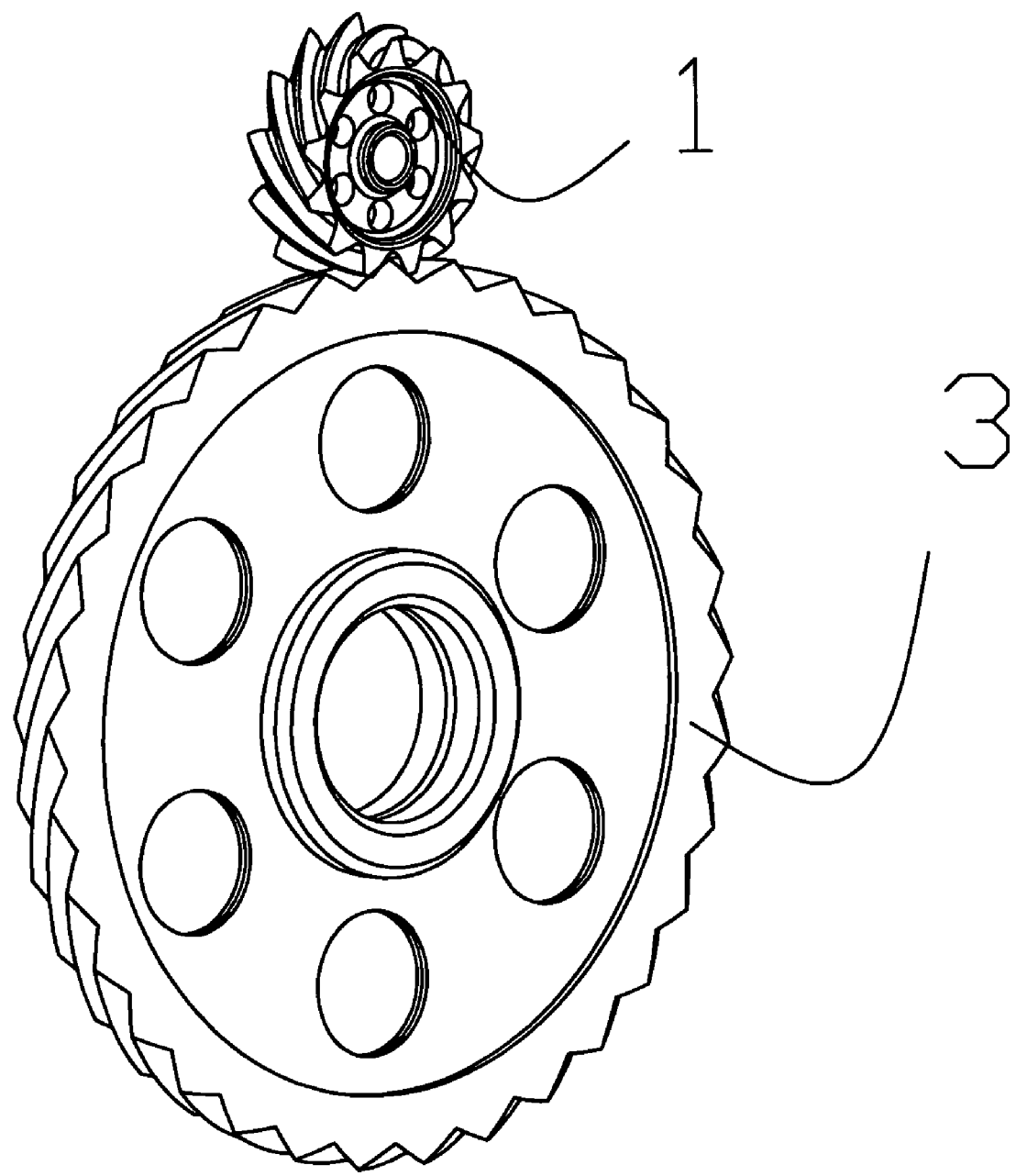
FIG. 2 is an isometric view of a design with enveloping worm in mesh with matting gear having axis of rotation parallel to axis of rotation of enveloping worm where enveloping worm has less than 180 degree of revolution of threads.

FIG. 2 shows the same enveloping worm 1 which has at least one thread that is engaged by at least one tooth of said matting gear 3 or into meshing arrangement with gear 3 where axis of enveloping worm 1 and axis of matting gear are parallel. In this epicyclic gear train with enveloping worm, the enveloping worm 1 could have any design, however, it is preferred that the enveloping worm is utilized for standard enveloping or double enveloping worm/worm gear transmission. The difference is that we are using threads with less than one revolution or 180 or less degree of revolution and even 90 or less degree of revolution. Degree of thread revolution means an angle of enveloping worm thread rotation around its axis of rotation. For better dynamic action and easy manufacturing it is preferred that enveloping worm is made asymmetrically, as shown in FIG. 1 and FIG. 2. Enveloping worm 1 is just part of standard enveloping worm with 360 degree of revolution. Various known modifications of standard profile of enveloping worm threads can improve performance of epicyclic gear train.

Figure 3:
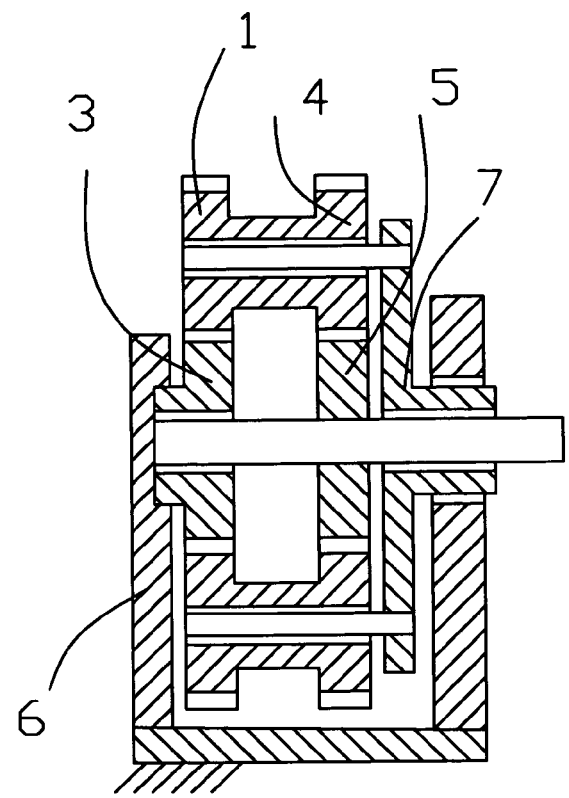
FIG. 3 is a schematic view of an epicyclic gear train having two enveloping worms attached to each other in external mesh with two matting gears.

FIG. 3 is a schematic view of an epicyclic gear train having two enveloping worms 1 and 4 coaxially arranged and attached to each other in external mesh with two matting gears, first 3 and second 5. To hold gears on the ground or in any machine base member 6 is used. Base member 6 can be used as a case for epicycle gear train. Enveloping worms 1 and 4 are satellite gears which are placed onto a rotating carrier 7 that supports said satellites. Second satellite gear 4 in meshing engagement with matting gear 5 could be spur gears or helical gears.

Figure 4:
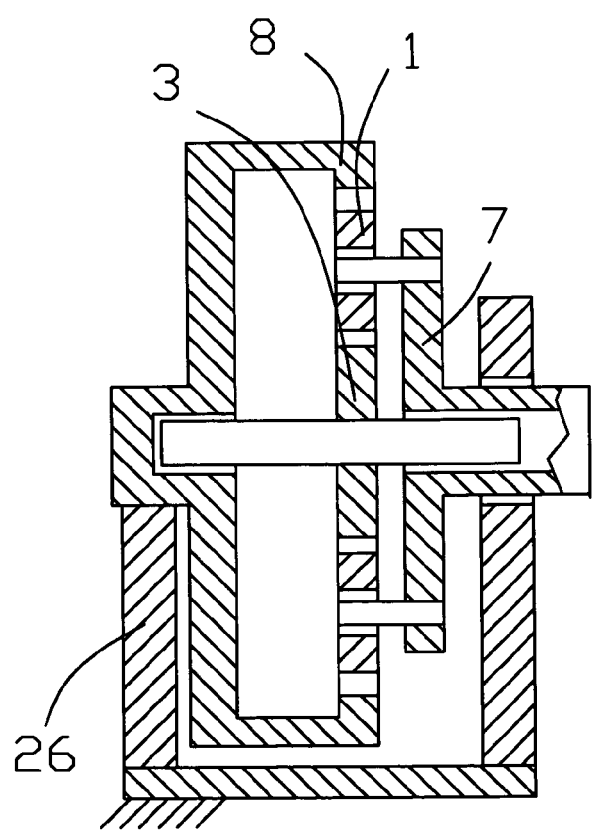
FIG. 4 is a schematic view of an epicyclic gear train having an enveloping worm in external and internal mesh with two matting gears.

FIG. 4 is a schematic view of an epicyclic gear train having an enveloping worm 1 in external mesh with matting gear 3 and in internal mesh with matting gear 8.

Figure 5:
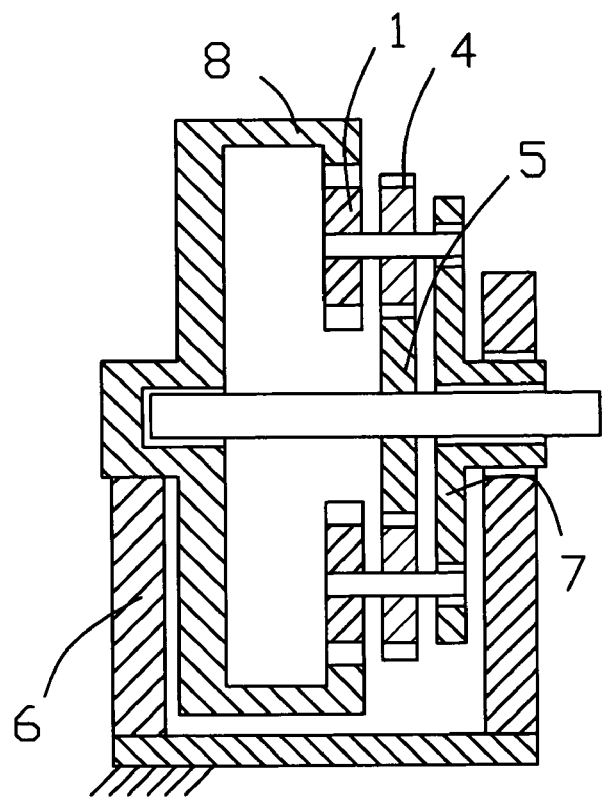
FIG. 5 is a schematic view of an epicyclic gear train having two enveloping worms attached to each other in a compound mesh with two matting gears.

FIG. 5 is a schematic view of an epicyclic gear train having two enveloping worms 1 and 4 with a coaxial axis attached to each other to rotate together in a compound mesh with two matting gears 5 and 8.

Figure 6:
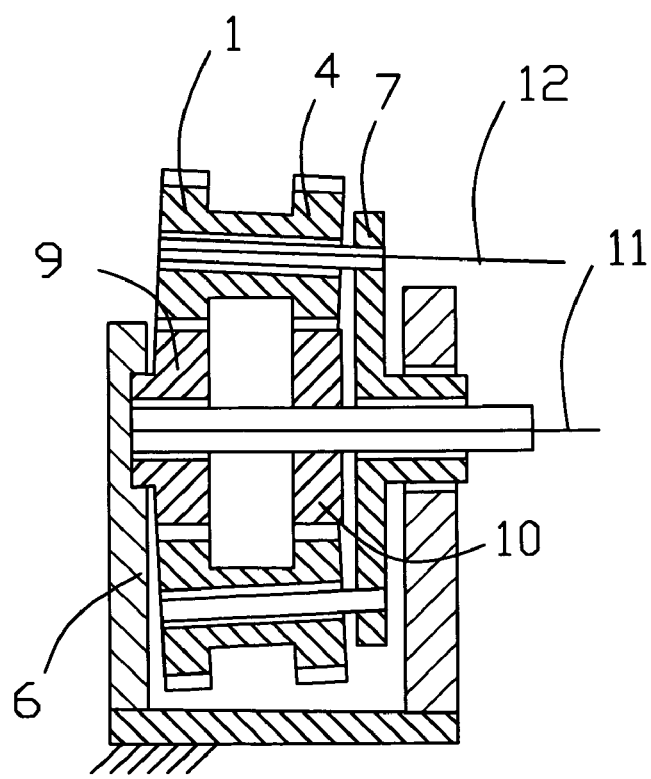
FIG. 6 is a schematic view of an epicyclic gear train having two enveloping worms attached to each other in external mesh with two matting gears, where axis of first and second matting gears intersects with axis of rotation of two enveloping worms as satellites.

FIG. 6 is a schematic view of an epicyclic gear train having two enveloping worms 1 and 4 coaxially arranged and attached to each other to rotate together in external mesh with two matting gears 9 and 10. Axis 11 of rotation of first matting gear 9 and second gear 10 are coaxial and are crossing axis 12 of rotation of enveloping worm 1 and enveloping worm 4.

Figure 7:
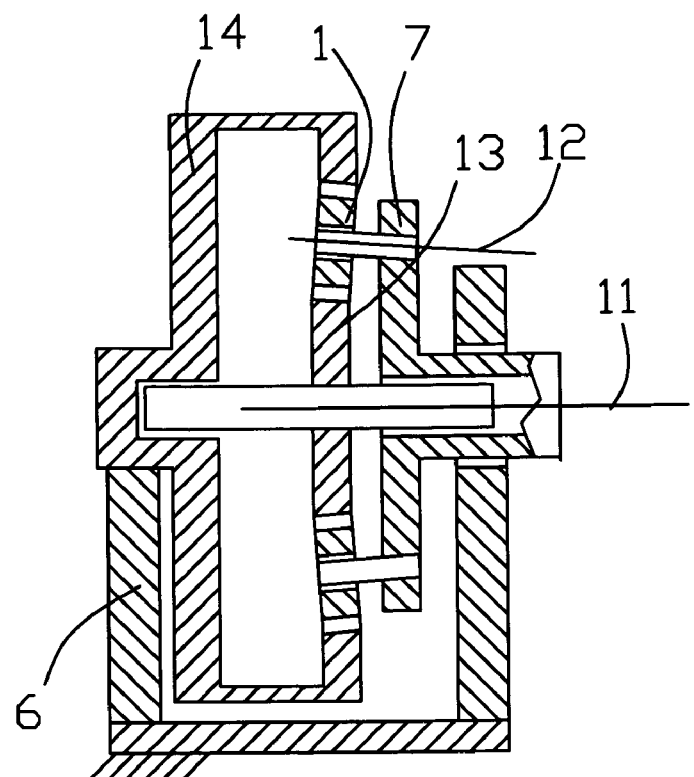
FIG. 7 is a schematic view of an epicyclic gear train having an enveloping worm in external and internal mesh with two matting gear, where axis of first and second matting gears intersects with axis of rotation of an enveloping worm as satellite.

FIG. 7 is a schematic view of an epicyclic gear train having enveloping worm 1 in external mesh with matting gear 13 and in internal mesh with matting gear 14. Gear 13 and gear 14 have coaxial axis of rotation. Axis of rotation 11 of matting gears 13 and 14 is crossing axis 12 of rotation of enveloping worm 1.

Figure 8:
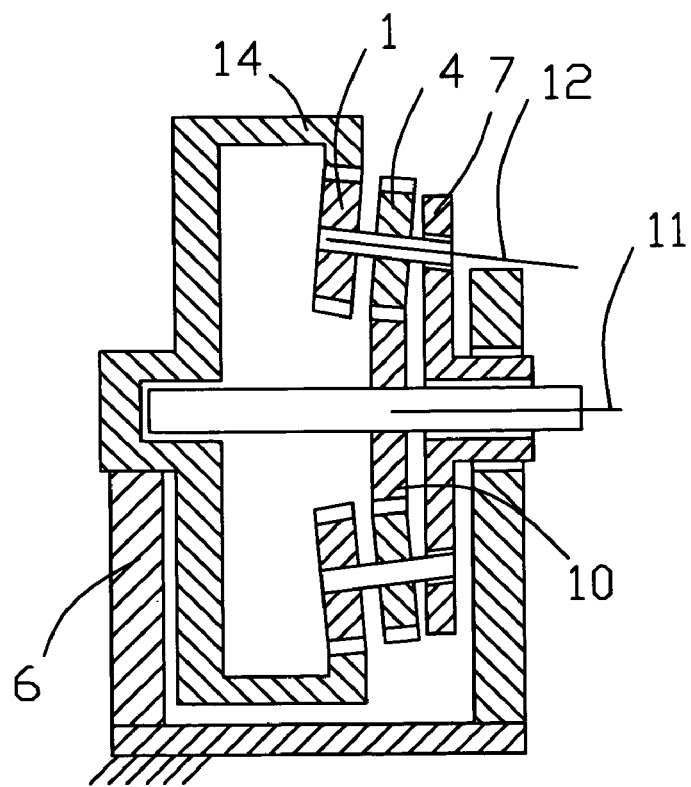
FIG. 8 is a schematic view of an epicyclic gear train having two enveloping worms attached to each other in a compound mesh with two matting gears, where axis of first and second matting gears intersects with axis of rotation of two enveloping worms as satellites.

FIG. 8 is schematic view of an epicyclic gear train having two enveloping worms 1 and 4 with a coaxial axis attached to each other to rotate together in a compound mesh with two matting gears 14 and 10. Axis of rotation 11 of matting gears 14 and 10 are crossing axis 12 of rotation of enveloping worms 1 and 4. Placement of satellite enveloping worms 1 and 4 on the axis that intersects axis of matting gears according with FIG. 6, FIG. 7 and FIG. 8 improves contact pattern of motion and increases efficiency by providing more rolling action. Practical angle between shafts 11 and 12 for most design configurations is about 5 degrees.

Figure 9:
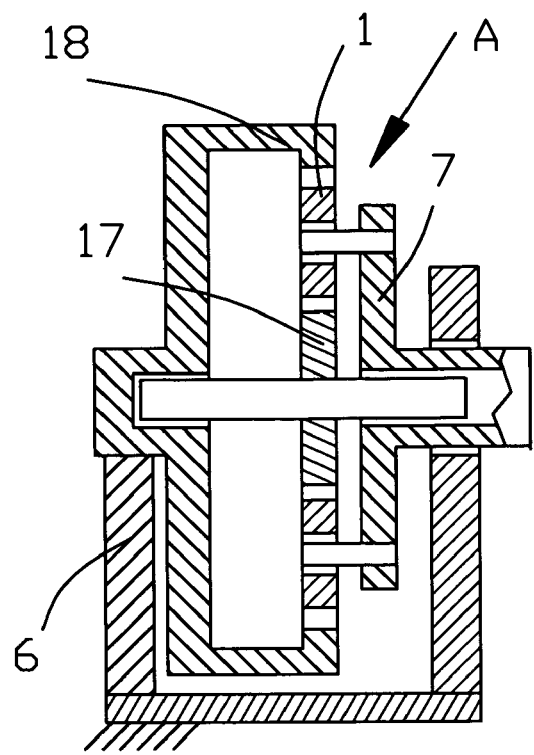
FIG. 9 is a schematic view of an epicyclic gear train having an enveloping worm in external and internal mesh with two matting gears, where axis of first and second matting gears crosses with axis of rotation of an enveloping worm as a satellite.

FIG. 9 shows an example of a schematic view of arrow A of epicyclic gear train where axis 15 of rotation of enveloping worm 1 is crossing axis 16 of rotation of matting gears 17 and 18. Matting gear 17 axis of rotation is coaxial with axis of rotation of matting gear 18.

Figure 10:
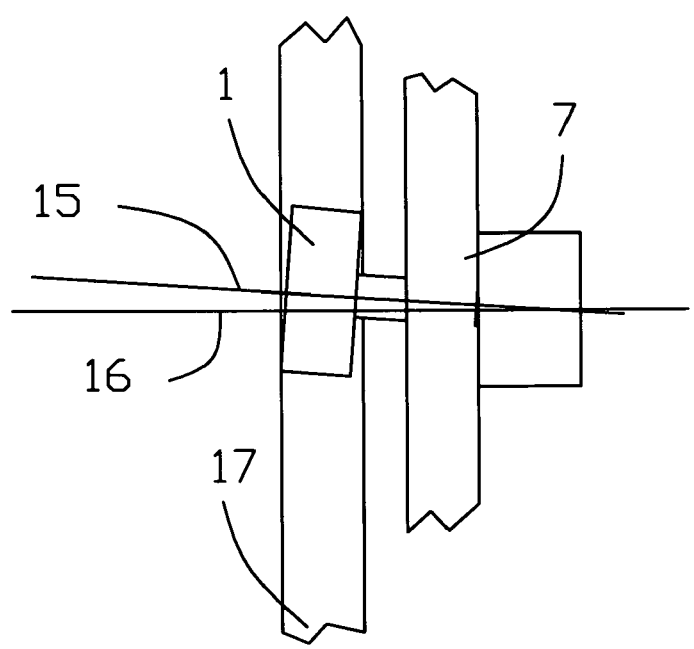
FIG. 10 is a schematic view of a relatively positioned enveloping pinion and one matting gear from FIG. 9

FIG. 10 shows enveloping worm 1 in a relative position to matting gear 17 from FIG. 9. Axis 16 of matting gear 17 and axis of carrier 7 are coaxial and are crossing axis 15 of enveloping worm 1. Crossing axes 15 and 16 improves contact pattern and increases efficiency of motion.

Figure 11:
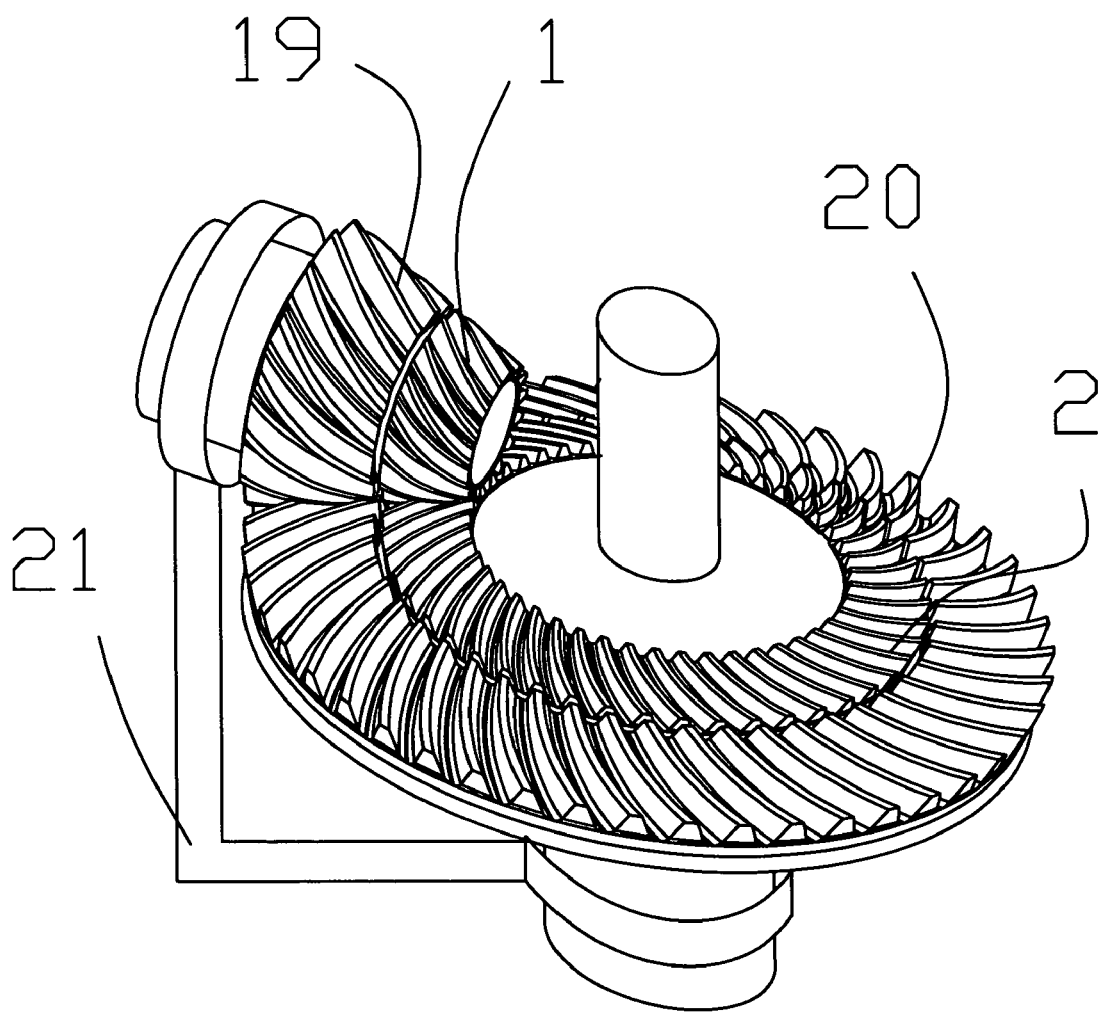
FIG. 11 is an isometric view of an epicyclic gear train with enveloping worms in mesh with matting face gears according to the principles of the present invention.

FIG. 11 is an isometric view of an epicyclic gear train with enveloping worms 1 and 19 attached to each other and in mesh with matting face gears 2 and 20 according to the principles of the present invention. Enveloping worms 1 and 19 are rotatably located on a carrier 21.

Figure 12:
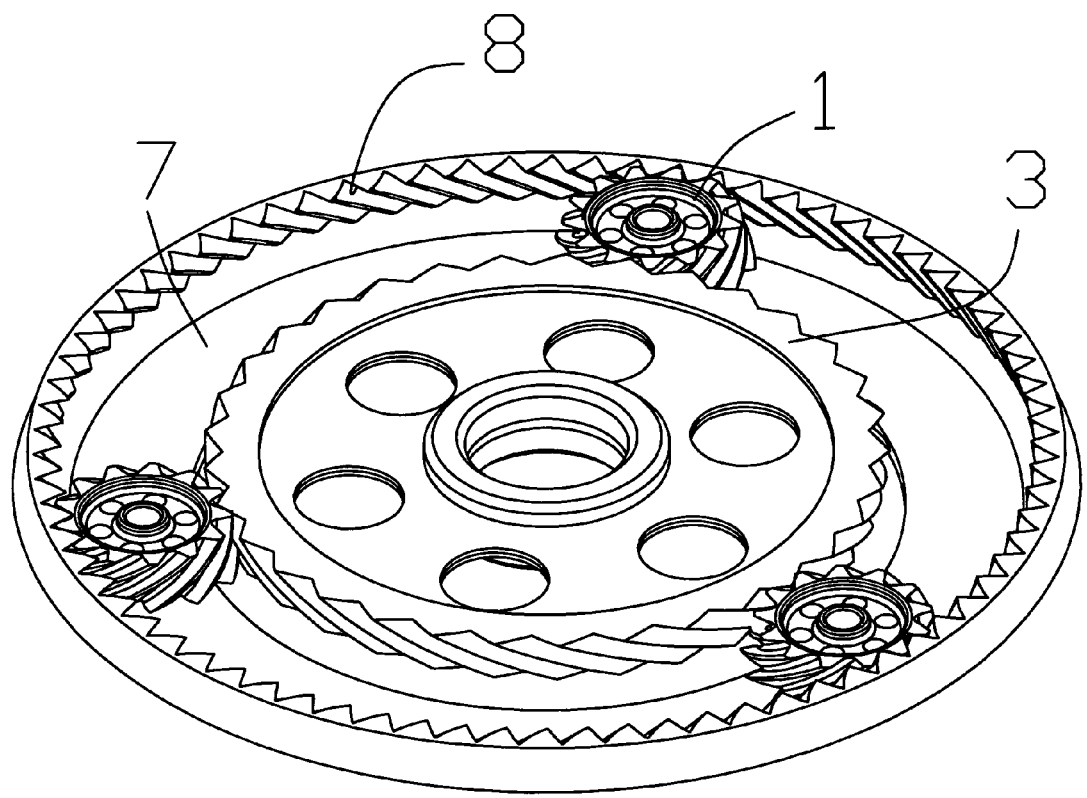
FIG. 12 is an isometric view of an epicyclic gear train with enveloping worm in internal and external mesh with two matting gears having a parallel shaft according to the principles of the present invention.

An isometric view of an epicyclic gear train with enveloping worms 1 in internal and external mesh with parallel shaft matting gears 3 and 8 is shown in FIG. 12. Satellites as enveloping worms 1 are rotatably located on carrier 7.

Figure 13:
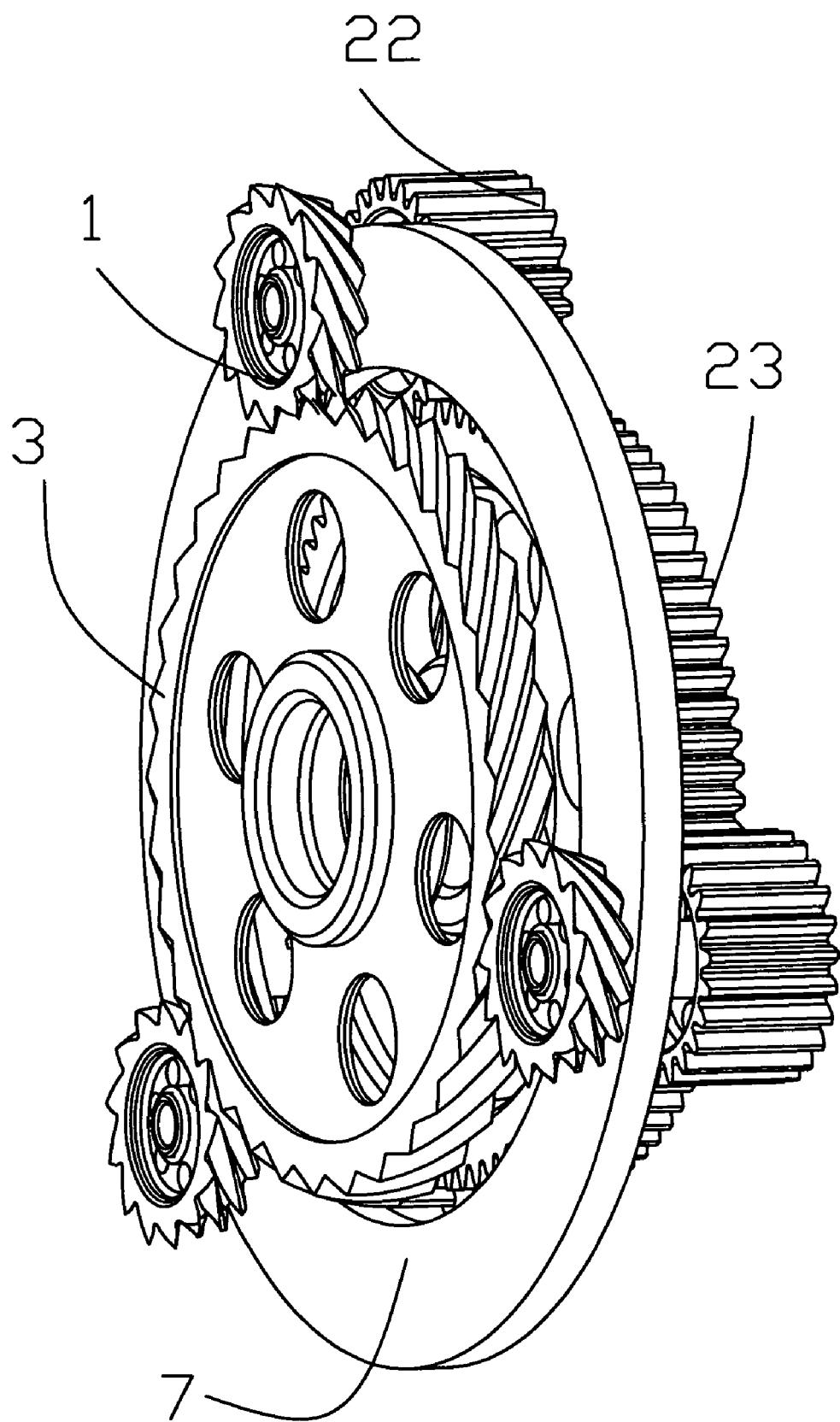
FIG. 13 is an isometric view of an epicyclic gear train with two satellites attached to each other in mesh with two matting gears having a parallel shaft according to the principles of the present invention.

FIG. 13 is an isometric view of an epicyclic gear train with two sets of satellites attached to each other to rotate together in mesh with matting gears. First satellite gear is enveloping worm 1 and second satellite gear may be any conventional gear with parallel axis of rotation. It could be spur or helical gear. FIG. 13 shows spur gear 22 in meshing engagements with matting spur gear 23. Enveloping worm 1 is attached to helical gear 22 and is placed onto a rotating carrier 7 for supporting said satellite gears 1 and 22. Showing three sets of satellite 1 and 22 is for the purpose of dynamic balance and increasing load capacity.

Figure 14:
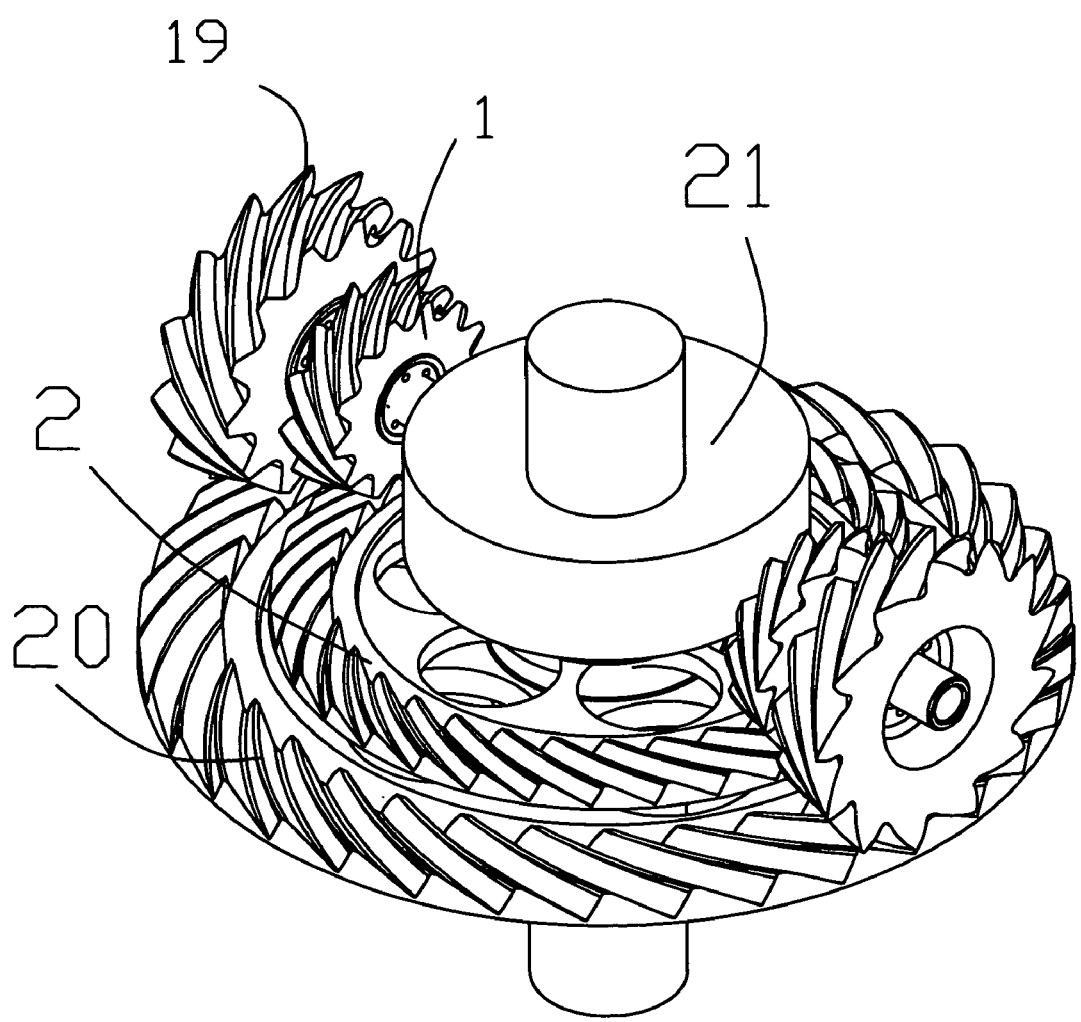
FIG. 14 and FIG. 15 are isometric views of an epicyclic gear train with two satellite gears attached to each other in a mesh with matting face gears according to the principles of the present invention.
Figure 15:
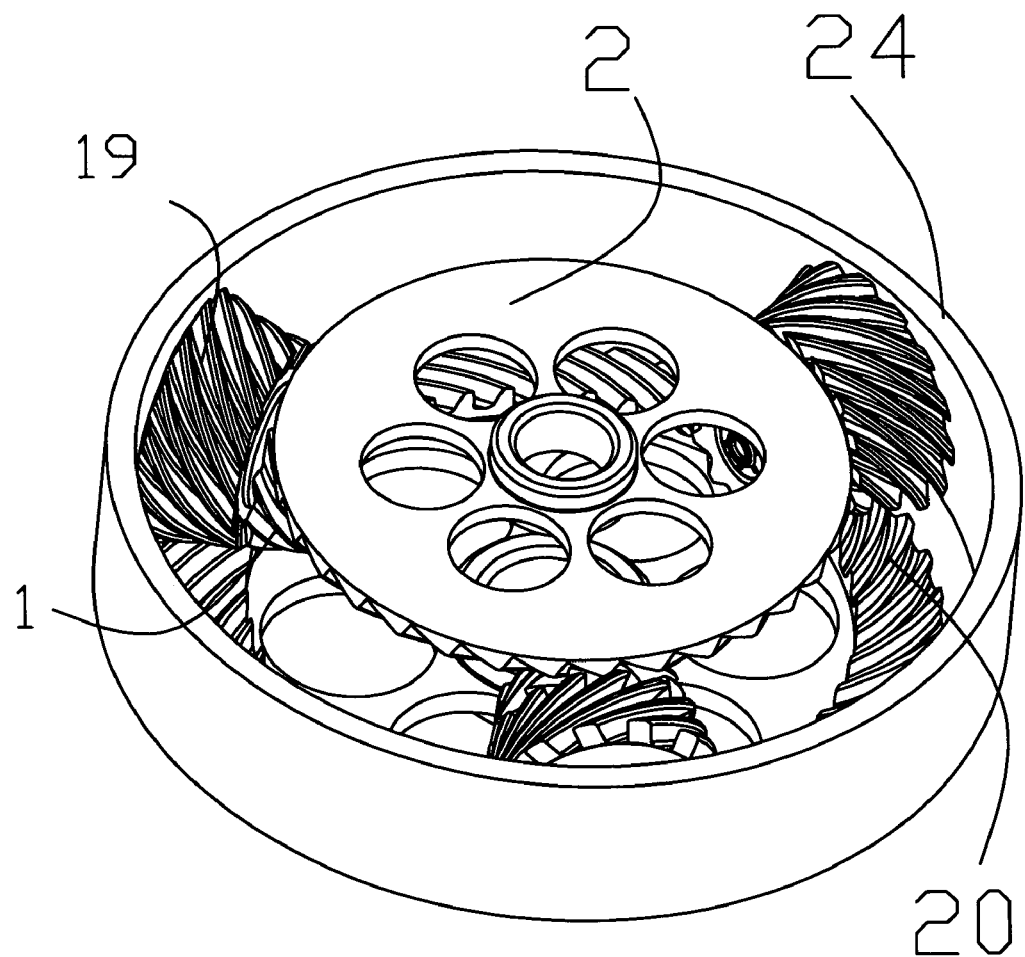

FIG. 14 and FIG. 15 are isometric views of an epicyclic gear train with two sets of satellites attached to each other to rotate together in mesh with face matting gears. First satellite gear enveloping worm 1 and second satellite gear enveloping worm 19 are attached to each other. Enveloping worms 1 and 19 are placed onto a rotating carrier 21 or 24 for supporting said satellite gears 1 and 19. Showing two sets of satellites 1 and 19 is for the purpose of dynamic balance and increasing load capacity. Second satellite gear 19 and its matting second gear 20 could also be spiral bevel gears or face gears.

In order to be able to transmit power by using epicyclic gear train we need to have one degree of motion of entire unit having three rotating input/output members: first matting gear, second matting gear and carrier. This could be done by grounding one of the members: first or second matting gears or carrier with satellite gears. Two other members will provide input/output motion with increased or decreased ratio. FIG. 3 shows base member 6 attached to matting gear 3 as a sun gear. Also carrier 7 or another matting gear 5 may be attached to base 6. FIG. 4 shows base member 6 attached to matting gear 8 as a ring gear. Also carrier 7 or another matting gear 3 could be attached to base 6. FIG. 5 shows base member 6 attached to matting gear 8 as a ring gear. Carrier 7 or another matting gear 5 could also be attached to base 6. FIG. 6 shows base member 6 attached to matting gear 9 as a sun gear. Carrier 7 or another matting gear 10 could also be attached to base 6. FIG. 7 shows base member 6 attached to matting gear 14 as a ring gear. Carrier 7 or another matting gear 13 could also be attached to base 6. FIG. 8 shows base member 6 attached to matting gear 14 as a ring gear. Carrier 7 or another matting gear 10 could also be attached to base 6. FIG. 9 shows base member 6 attached to matting gear 18 as a ring gear. Carrier 7 or another matting gear 17 could also be attached to base 6.

The enveloping worm thread has a rolling action contact relationship with the teeth of the matting gear, which provides an increased efficiency compared to a helical planetary transmission. In the present application, it is a surface-to-surface contact between the enveloping worm gear teeth and the matting gear that increases the torque capacity of the epicyclic gear train.

The lower noise of the epicyclic gear train with satellites as enveloping worms compared to helical or spiral bevel epicyclic gear train make using the present invention more beneficial in motor vehicle powertrain applications. For the same size, this invention can provide almost twice the capacity of traditional helical planetary transmissions.

ADVANTAGES OF EPICYCLIC GEAR TRAIN

Transmit More Power with Smaller Gears.

Compact alternative for planetary transmissions with helical gears. Enveloping worm in mesh with matting gear has high torque capacity due to surface to surface contact mesh that reduces contact stresses.

In automotive power train applications it saves up to 30% of space and significantly reduces weight.

Efficiency is Extremely High

Enveloping worm face drive or enveloping worm parallel axis drive is very efficient. It has higher percentage of rolling/sliding motion and excellent dynamic lubrication. It has extended life even without lubrication.

Lower Noise

Each thread of the enveloping worm satellite most of the time is in mesh with two teeth. It reduces impact of engagement and disengagement, increases the contact ratio and makes quieter motion.

Manufacturability

Using existing gear cutting machines can make epicyclic gear train not more expensive than existing planetary transmissions. For some configuration, forging technology or power metallurgy could be applied as well.

Several embodiments of the present invention have been disclosed. A worker of ordinary skill in the art would recognize that certain modifications would come within the scope of this invention. In the invention being thus described, it will be obvious that the same may be varied in many ways. Such variations are not to be regarded, as a departure from the spirit and scope of the invention, and all such modifications as would be obvious to one skilled in the art are intended to be included within the scope of the following claims.

What is claimed is:

1. Epicyclic gear train, comprising:
   a rotating carrier;
   a satellite gear rotatably supported by said carrier;
   first and second coaxial gears in mesh with said satellite gear;
   said carrier is coaxial to said first and second gears;
   said satellite gear is an enveloping worm and first and second gears are mating gears with said enveloping worm;
   said first and second gears have axis of rotation intersecting axis of rotation of said enveloping worm.

2. Epicyclic gear train as recited in claim 1 wherein said enveloping worm has threads with less than one revolution.

3. Epicyclic gear train, comprising:
   a rotating carrier;
   a satellite gear rotatably supported by said carrier;
   first and second coaxial gears in mesh with said satellite gear;
   said carrier is coaxial to said first and second gears;
   said satellite gear is an enveloping worm and first and second gears are mating gears with said enveloping worm;
   said first and second gears have axis of rotation parallel to axis of rotation of said enveloping worm.

4. Epicyclic gear train as recited in claim 3 wherein said enveloping worm has threads with less than one revolution.

5. Epicyclic gear train, comprising:
   a rotating carrier;
   first and second coaxial satellite gears rotatably supported by said carrier;
   first and second coaxial gears in mesh with said satellite gears;
   said carrier is coaxial to said first and second gears;
   said first satellite gear is an enveloping worm;
   said second satellite gear is an enveloping worm;
   said first gear is a mating gear with said first enveloping worm;
   said second gear is a mating gear with second enveloping worm.

6. Epicyclic gear train as recited in claim 5 wherein said enveloping worm has threads with less than one revolution.

7. Epicyclic gear train as recited in claim 5 wherein said first and second gears have axis of rotation intersecting axis of rotation of said enveloping worms.

8. Epicyclic gear train as recited in claim 5 wherein said first and second gears have axis of rotation parallel to axis of rotation of said enveloping worms.

* * * * *